United States Patent [19]

Fuse et al.

[11] Patent Number: 5,508,365
[45] Date of Patent: Apr. 16, 1996

[54] METHOD OF PRODUCING VINYL CHLORIDE RESINS HAVING IMPROVED MOLDABILITY AND PROCESSABILITY USING MIXTURES OF FATTY ACID ESTERS

[75] Inventors: Kazuyoshi Fuse, Niihama; Hiroshi Yoshioka, Funabashi, both of Japan

[73] Assignee: Sumitomo Chemical Company, Limited, Osaka, Japan

[21] Appl. No.: 290,126

[22] Filed: Aug. 15, 1994

Related U.S. Application Data

[62] Division of Ser. No. 40,022, Mar. 30, 1993, abandoned.

[30] Foreign Application Priority Data

Mar. 30, 1992 [JP] Japan ................................ 4-071946
May 21, 1992 [JP] Japan ................................ 4-128611

[51] Int. Cl.$^6$ ................................................ C08F 2/20
[52] U.S. Cl. ........................ 526/209; 526/210; 526/213
[58] Field of Search ................................ 526/209, 210, 526/213, 216

[56] References Cited

U.S. PATENT DOCUMENTS 2,987,510  6/1961  Lederer.
3,812,073  5/1974  Ito et al..
4,775,698  10/1988 Cozens ................................ 526/202

FOREIGN PATENT DOCUMENTS 912507    4/1954   Germany.
1098716   2/1961   Germany.
51-20209  6/1976   Japan.
53-6350   1/1978   Japan.
55-17054  5/1980   Japan.
711355    6/1954   United Kingdom.
804448    11/1958  United Kingdom.

*Primary Examiner*—Christopher Henderson
*Attorney, Agent, or Firm*—Sughrue, Mion, Zinn, Macpeak & Seas

[57] ABSTRACT

Disclosed is a method of producing a vinyl chloride resin which comprises subjecting a monomer selected from the group consisting of vinyl chloride and a monomer mixture containing vinyl chloride, as a major component, and at least one ethylenically unsaturated monomer copolymerized therewith as a minor component to polymerization reaction in the presence of (a) a pentaerythritol or dipentaerythritol fatty acid ester or
(b) a pentaerythritol or dipentaerythritol fatty acid ester and a glycerol fatty acid ester.

5 Claims, No Drawings

METHOD OF PRODUCING VINYL CHLORIDE RESINS HAVING IMPROVED MOLDABILITY AND PROCESSABILITY USING MIXTURES OF FATTY ACID ESTERS

This is a divisional of Application No. 08/040,022, filed Mar. 30, 1993, now abandoned.

FIELD OF THE INVENTION

The present invention relates to a method of producing vinyl chloride resins. More particularly, it relates to a method of producing vinyl chloride resins excellent in moldability and processability.

PRIOR ART

Higher productivity, cost reduction and energy saving being industrially important today, there is a constant demand for vinyl chloride resins with improved workability, i.e., for resins amenable to high speed processing, thin-walled processing and low temperature processing.

Generally speaking, workability of vinyl chloride resins, particularly rigid types of PVC resin, depends chiefly on their fusion process (gelation property or fusion property) and flow characterisitics in the molten state (flow property).

For attaining generally improved processability, Japanese Examined Patent Publication (Kokoku) No. 55- 17054, for instance, discloses a rigid vinyl chloride resin composition comprising a vinyl chloride resin and a higher fatty acid ester of pentaerythritol or dipentaerythritol as a lubricant. Japanese Examined Patent Publication (Kokoku) No. 51-20209 and Japanese Unexamined Patent Publication (Kokai) No. 53-6350 disclose compositions each comprising a vinyl chloride resin and a mixed ester obtainable by reacting pentaerythritol or dipentaerythritol with a dibasic organic acid and a higher fatty acid, said mixed ester serving as a lubricant.

Japanese Examined Patent Publication (Kokoku) No. 51-13195 describes a method of producing a vinyl chloride resin improved in processability, heat stability and antistatic property which comprises subjecting a monomer predominantly comprising vinyl chloride to suspension polymerization in an aqueous medium in the presence of a higher fatty acid monoester of glycerol.

The resin compositions described in the above-cited Japanese Examined Patent Publication (Kokoku) No. 51-20209, Japanese Unexamined Patent Publication (Kokai) No. 53-6350 and Japanese Examined Patent Publication (Kokoku) No. 55-17054 are indeed conducive to reduced driving power requirements because of the lubricity provided between processing hardware and resin, but are only insufficiently improved in the flow characteristics of the molten resin itself and the delay in gelation takes place. Therefore, none of these compositions are suited to thin-walled molding or low temperature processing at high speed.

The resin obtainable by the method described in Japanese Examined Patent Publication (Kokoku) No. 51-13195 is not fully satisfactory in melt flow properties, either, notwithstanding the fact that improvement in processability is described to be one of its objects.

SUMMARY OF THE INVENTION

Accordingly it is an object of the invention to provide a method of producing vinyl chloride resins excellent in melt flow and gelation properties, with a good balance therebetween, and showing good processability.

The invention provides a method of producing vinyl chloride resins which comprises subjecting a monomer selected from the group consisting of vinyl chloride and a monomer mixture containing vinyl chloride, as a major component, and at least one ethylenically unsaturated monomer copolymerizable therewith, as a minor component, to polymerization reaction in the presence of (a) a pentaerythritol or dipentaerythritol fatty acid ester or (b) a pentaerythritol or dipentaerythritol fatty acid ester and a glycerol fatty acid ester.

DETAILED DESCRIPTION OF PREFERRED EMBODIMENTS

The monomer polymerizable by the method of the invention is vinyl chloride or a monomer mixture composed of vinyl chloride as a major component and at least one ethylenically unsaturated monomer copolymerizable therewith as a minor component. Such mixture preferably contains at least 50%. by weight, more preferably more than. 80% by weight but less than 100% by weight, of vinyl chloride. Examples of other ethylenically unsaturated monomers copolymerizable with vinyl chloride are any vinyl monomers which are copolymerizable with vinyl chloride, and particularly include olefins, such as ethylene and propylene, vinyl halides other than vinyl chloride, vinylidene halides, vinyl ethers, vinyl esters such as vinyl acetate, acrylic or methacrylic acid esters (in particular $C_{1-8}$ alkyl esters) and the like.

In accordance with one embodiment of the invention, the monomer is subjected to polymerization in the presence of a pentaerythritol or dipentaerythritol fatty acid ester.

The pentaerythritol or dipentaerythritol fatty acid ester includes those in which at least one of the hydroxyl groups in each pentaerythritol or dipentaerythritol molecule has been esterified. Preferred among them are, in the case of pentaerythritol fatty acid esters, those in which 3 or 4 hydroxyl group in each pentaerythritol molecule have been esterified and, in the case of dipentaerythritol fatty acid esters, those in which 4 to 6 hydroxyl groups in each dipentaerythritol molecule have been esterified. Generally, it is desirable that they have a degree of esterification of not less than 70%. The degree of esterification used herein is defined as an average ratio of the number of esterified hydroxyl groups in pentaerythritol or dipentaerythritol fatty acid ester to the total number (4 or 6) of the hydroxyl groups in the corresponding starting pentaerythritol or dipentaerythritol. Most preferred are those pentaerythritol or dipentaerythritol fatty acid esters in which all the hydroxyl groups in each pentaerythritol or dipentaerythritol molecule have been esterified.

Fatty acids containing about 5 to 22 carbon atoms are suited for use as said fatty acid. Typical examples are hexanoic acid, lauric acid, palmitic acid, stearic acid, oleic acid, arachic acid and behenic acid. These fatty acids may be used singly or two or more of them may be used in combination.

When suspension polymerization is employed as the method of polymerization, fatty acids containing 8 to 22 carbon atoms are suitable since the product resin particles tend to become varying in shape and form and/or the proportion of coarse particles tends to increase with the decrease in the number of carbon atoms contained in the fatty acid.

Said fatty acid esters are per se known in the art and many of them are available on the market.

Among the pentaerythritol or dipentaerythritol fatty acid esters (a) mentioned above, those in which the constituent fatty acid is selected from the group consisting of laurie acid, palmitic acid and stearic acid are preferred. Particularly preferred are pentaerythritol tri- and tetrastearate, pentaerythritol tri- and tetrapalmitate, dipentaerythritol di-, tri-, tetra-, penta- and hexastearate, dipentaerythritol hexapalmitate and the like.

Also suitable for use as the pentaerythritol or dipentaerythritol fatty acid ester in the practice of the invention are the so-called mixed esters which can be obtained by esterifying pentaerythritol or dipentaerythritol with any of said fatty acids plus a minor proportion of a dibasic organic acid. Thus, such mixed esters correspond to said pentaerythritol or dipentaerythritol fatty acid esters which are further esterified in part by dibasic organic acids. That is to say, the mixed ester may contain small amount of a dibasic organic acid ester moiety in addition to the fatty acid ester moiety.

As said mixed esters, there may be mentioned those described in Japanese Unexamined Patent Publication (Kokai) No. 53-6530. Thus, as examples of the dibasic organic acid that can be used, there may be mentioned dicarboxylic acids, preferably dicarboxylic acids containing 3 to 8 carbon atoms, such as malonic acid, maleic acid, succinic acid, glutaric acid, adipic acid, pimelic acid, phthalic acid and the like. These may be used either singly or in combination.

The proportions of the ester moiety formed by the dibasic organic acid mentioned above and the ester moiety formed by the above-mentioned fatty acid in said mixed esters are such that the amount of the dibasic organic acid constituting the dibasic organic acid ester moiety is about 0.05 to 0.3 mole, preferably about 0.1 to 0.3 mole, per mole of the fatty acid constituting the fatty acid ester moiety.

In the mixed esters, too, the hydroxyl groups of the pentaerythritol or dipentaerythritol molecule may partly remain unesterified. Generally, it is preferable that the degree of esterification with the fatty acid and dibasic organic acid is not less than 70%.

These mixed esters are per se known in the art and various commercial products are available on the market. Among these mixed esters, pentaerythritol adipic acid/stearic acid mixed ester, pentaerythritol adipic acid/palmitic acid mixed ester, dipentaerythritol adipic acid/stearic acid mixed ester, dipentaerythritol adipic acid/palmitic acid mixed ester and the like are preferred.

Preferably, the pentaerythritol or dipentaerythritol fatty acid esters are used in an amount of about 0.01 to 10 parts, more preferably about 0.1 to 5 parts by weight, per 100 parts by weight of said monomer.

If they are used in an amount less than 0.01 part by weight, the processability-improving effect tends to be unsatisfactory.

If, conversely, they are used in an excessively large amount, the rigidity and/or other mechanical/physical properties may possibly be impaired when the resins produced are used as rigid vinyl chloride resins.

When suspension polymerization is employed as the method of polymerization, it is desirable to use said esters in an amount up to 5 parts by weight since when they are used in larger amounts, the resin particles produced tend to be varying in shape and form and/or coarse particles tend to be formed in large amounts.

In accordance with another embodiment of the invention, the pentaerythritol or dipentaerythritol fatty acid ester (a) mentioned above may be used in combination with a glycerol fatty acid ester. Thus, in accordance with this embodiment of the invention, the polymerization reaction may be conducted in the presence of a pentaerythritol or dipentaerythritol fatty acid ester (a) plus a glycerol fatty acid ester, whereby vinyl chloride resins much more improved in processing characteristics, such as flow and/or gelation characteristics, in particular in gelation property (or fusion property), can be obtained.

The glycerol fatty acid ester contains at least one, preferably one, esterified hydroxyl group per glycerol molecule.

Suitable as the fatty acid are those containing about 5 to 22 carbon atoms.

Typical examples are hexanoic acid, lauric acid, palmitic acid, stearic acid, oleic acid, arachic acid, behenic acid and the like. These may be used either singly or in combination.

When suspension polymerization is employed as the method of polymerization, it is desirable that the fatty acid contains 8 to 22 carbon atoms. This is because the product resin particles tend to become varying in shape and form and/or the proportion of coarse particles tends to increase with the decrease in the number of carbon atoms contained in the fatty acid.

Glycerol fatty acid esters of such kind are pet se known and various commercial grades thereof are available.

Particularly preferred among these glycerol fatty acid esters are glycerol monolaurate, glycerol mono-palmitate, glycerol monostearate, glycerol monooleate, and the like.

In this embodiment, too, the pentaerythritol or dipentaerythritol fatty acid esters (a) mentioned above are preferably used in an amount of about 0.01 to 10 parts by weight, more preferably about 1 to 5 parts by weight, per 100 parts by weight of the monomer.

The glycerol fatty acid esters are preferably used in an amount of about 0.01 to 10 parts by weight, more preferably about 0.1 to 3 parts by weight, per 100 parts by weight of the monomer. When the amount of the glycerol fatty acid ester is below 0.01 part by weight per 100 parts by weight of the monomer, the processability-improving effect tends to become less significant.

The glycerol fatty acid esters is preferably used in an amount of about 0.1 to 5 parts by weight, more preferably about 0.3 to 3 parts by weight, per part by weight of the pentaerythritol or dipentaerythritol fatty acid ester (a) mentioned above.

The total amount of the pentaerythritol or dipentaerythritol fatty acid ester (a) and the glycerol fatty acid ester is preferably about 0.02 to 20 parts by weight, more preferably about 0.2 to 5 parts by weight, per 100 parts of the monomer.

When said total amount is excessive, the product resins, when used as rigid vinyl chloride resins, may show decreased rigidity and/or other decreased mechanical/physical properties.

When suspension polymerization is employed as the method of polymerization, the total amount of both kinds of fatty acid ester is desirably up to 10 parts by weight since when said amount is excessive, the product resin particles may become varying in shape and form and/or coarse particles tend to be formed in large amounts.

In the practice of the invention, the polymerization may be performed using any of the polymerization techniques well known for vinyl chloride or vinyl chloride-based monomer mixtures, for example in the manner of suspension, polymerization, microsuspension polymerization or emulsion polymerization.

The catalyst or catalysts to be used, the amount thereof, the temperature conditions, the apparatus to be used and other conditions are not critical but may be the same as those well known in the art and suited for each polymerization technique mentioned above. The presence of both kinds of fatty acid ester will not adversely affect the polymerization reaction.

For example, the suspension polymerization can be carried out in a conventional manner in an aqueous medium such as water containing a conventional dispersant (such as partially saponified polyvinyl acetate, carboxymethyl cellulose, gelatin, starch or like water-soluble macromolecular compound) and if desired an auxilliary dispersion stabilizer (such as barium sulfate or the like) with use of a conventional oil-soluble initiator such as benzoyl peroxide, lauroyl peroxide, 2,2'-azobisisobutyronitrile, di-2-ethylhexyl peroxydicarbonate or the like at a temperature effective to effect the polymerization (usually about 20° to 80° C.) with stirring until the desired polymer is obtained. In the present invention, a pentaerythritol or dipentaerythritol fatty acid ester optionally in combination with a glycerol fatty acid ester should be present in said aqueous medium. After the polymerization reaction is terminated, the resulting polymer slurry is subjected to a conventional solid-liquid separation method such as centrifugation or filtration to separate the polymer from the aqueous medium. The separated polymer is dried to remove adhered moisture, giving polymer particles.

Furthermore, the emulsion polymerization can be carried out in a conventional manner in an aqueous medium such as water containing a conventional emulsifier (such as a salt of sulfuric acid ester of higher alcohol, alkylsulfonic acid salt or like anionic surfactant or polyoxyethylene alkyl ether or like nonionic surfactant) with use of conventional water-soluble initiator (such as hydrogen peroxide, potassium persulfate, ammonium persulfate or a redox catalyst) at a temperature of about 20° to 80° C. with stirring until the desired polymer is obtained. In the present invention, a pentaerythritol or dipentaerythritol fatty acid ester optionally in combination with a glycerol fatty acid ester should be present in said aqueous medium. After the polymerization reaction is terminated, the resulting polymer latex is spray-dried to obtain polymer fine particles.

The microsuspension polymerization can also be carried out in a conventional manner in an aqueous medium such as water containing the conventional emulsifier with use of oil-soluble initiator such as one mentioned above. In this case, the reaction system is homogenized prior to the initiation of the polymerization. Then the polymerization is effected at a temperature of, for example, about 20 to about 80° C. with stirring until the desired polymer is obtained. In the present invention, a pentaerythritol or dipentaerythritol fatty acid ester optionally in combination with a glycerol fatty acid ester should be present in said aqueous medium. After the polymerization reaction is terminated, the resulting polymer latex is spray-dried to obtain polymer fine particles. Such polymerization method is described, for example, in "Encyclopedia of PVC", 1976, edited by LEONARD I. NASS, MARCEL DEKKER, INC., New York, pages 88–89.

Among these polymerization methods, suspension polymerization method is preferred.

The vinyl chloride resins produced in the above manner are suitably used particularly as rigid vinyl chloride resins and, of course, they can be used as plasticized vinyl chloride resins as well.

In using said resins, stabilizers, colorants, lubricants and other additives well known and conventional in the art, if necessary, may be added thereto as in the case of conventional vinyl chloride resins.

The vinyl chloride resins produced by the method of the invention show a high degree of melt flowability and a short gel time, and are well balanced in these respects.

In particular, for use as rigid vinyl chloride resins, they can be molded at a high molding rate since they show rapid gel time and high melt flowability when melted while maintaining their characteristic properties, and can give precisely molded articles even if the articles have complicated shape as in contour extrusion.

The following examples illustrate the invention in further detail. Unless otherwise specified, "part(s)" and "%" are all by weight.

Evaluation of the melt flowability and gelation property was made by the following methods.

(1) Melt flowability: 100 parts of the vinyl chloride resin and 3 parts of tribasic lead sulfate and 1 part of lead stearate were kneaded on a set of rolls at 180° C. for 5 minutes and the resulting mixture was molded into a sheet. Strips obtained by cutting said sheet were extruded through a die 1 mm in diameter at 180° C. at a shear rate of 12.2 $\text{sec}^{-1}$ using a capillary-type flow characteristics tester (Toyo Seiki Capillograph model IB) to measure the shear viscosity. The melt flowability is expressed in terms of the shear viscosity measured.

(2) Gelation property: 100 parts of the vinyl chloride resin and 3 parts of tribasic lead sulfate and 1 part of lead stearate were mixed using a blender while raising the temperature to 130° C. over 10 minutes, and the mixture was submitted to a mixer tester (Toyo Seiki Labo Plastomill, R60 roller mixer). Measurements were made at 180° C.×30 rpm and the time required for the torque value to reach a maximum was taken as the gel time.

EXAMPLE 1

The air in a 100-liter glass-lined polymerization vessel equipped with a stirrer was purged and the vessel was charged with 45 kg of deionized water, 40 kg of vinyl chloride monomer, 40 g of partially saponified polyvinyl alcohol, 15 g of tertiary-butyl peroxypivalate, 200 g of dipentaerythritol hexastearate (product of Riken Vitamin Kabushiki Kaisha, tradename "Rikestar 8L-02") and 20 g of mercaptoethanol (chain transfer agent), and the temperature was raised to 62° C. for initiating polymerization.

The pressure at the initial stage of the polymerization was 10 kg/cm$^2$ G. When the polymerization pressure dropped to 9 kg/cm$^2$ G, the polymerization was terminated by discharging the unreacted monomer from the vessel under atmospheric pressure.

The resulting polymer slurry was filtered using a centrifugal filter (product of Tanabe Tekkou Kabushiki Kaisha, Model Y-30) and dried to obtain polymer particles.

The vinyl chloride resin obtained was evaluated with respect to its mean degree of polymerization and flowability. The evaluation results are shown below in Table 1.

EXAMPLE 2

Polymerization was carried out in the same manner as in Example 1 except that dipentaerythritol distearate (product of Koei Kagaku Kabushiki Kaisha) was used in lieu of dipentaerythritol hexastearate. The evaluation results are shown in Table 1.

EXAMPLE 3

Polymerization was carried out in the same manner as in Example 1 except that 200 g of pentaerythritol stearic acid/adipic acid mixed ester (product of Riken Vitamin Kabushiki Kaisha, tradename "Rikestar EW-221"; esterified stearic acid/esterified adipic acid mole ratio=about 1/0.07; degree of esterification=80–85%) was used in lieu of 200 g of dipentaerythritol hexastearate. The evaluation results are shown in Table 1.

EXAMPLE 4

Polymerization was carried out in the same manner as in Example 3 except that the same mixed ester was used in an amount of 800 g (in lieu of 200 g). The evaluation results are shown in Table 1.

COMPARATIVE EXAMPLE 1

Polymerization was carried out in the same manner as in Example 1 except that the use of dipentaerythritol hexastearate was omitted. The evaluation results are shown in Table 1.

COMPARATIVE EXAMPLE 2

Polymerization was carried out in the same manner as in Example 1 except that glycerol monostearate (product of Woko Pure Chemical Industries, Ltd.) was used in lieu of dipentaerythritol hexastearate. The evaluation results are shown in Table 1.

COMPARATIVE EXAMPLE 3

The vinyl chloride resin obtained in Comparative Example 1 was fully mixed with 200 g of the same pentaerythritol adipic acid/stearic acid mixed ester as used in Example 3, and the resulting mixture was evaluated in the same manner as in Example 1. The evaluation results are shown in Table 1.

TABLE 1

|  | Mean degree of polymerization | Flowability (poises) |
|---|---|---|
| Example 1 | 680 | 188,000 |
| Example 2 | 690 | 196,000 |
| Example 3 | 690 | 195,000 |
| Example 4 | 700 | 114,000 |
| Comparative Example 1 | 690 | 270,000 |
| Comparative Example 2 | 680 | 238,000 |
| Comparative Example 3 | — | 235,000 |

EXAMPLE 5

The air in a 100-liter glass-lined polymerization vessel equipped with a stirrer was purged and the vessel was charged with 45 kg of deionized water, 40 kg of vinyl chloride monomer, 40 g of partially saponified polyvinyl alcohol, 15 g of tertiary-butyl peroxypivalate, 200 g of dipentaerythritol hexastearate (product of Riken Vitamin Kabushiki Kaisha, tradename "Rikestar SL-02"), 300 g of glycerol monostearate (Wako Pure Chemical Industries) and 20 g of mercaptoethanol (as a chain transfer agent), and the polymerization reaction was initiated by raising the temperature to 62° C.

The pressure at the initial stage of the polymerization was 10 kg/cm$^2$ G. When the polymerization pressure had dropped to 9 kg/cm$^2$ G, the polymerization was terminated by discharging the unreacted monomer from the vessel under atmospheric pressure.

The resulting polymer slurry was filtered using a centrifugal filter (product of Tanabe Tekkou Kabushiki Kaisha, Model Y-30) and dried to obtain polymer particles.

The vinyl chloride resin obtained was evaluated with respect to its mean degree of polymerization, flowability and gelation property. The evaluation results are shown in Table 2.

EXAMPLE 6

Polymerization was carried out in the same manner as in Example 5 except that 200 g of pentaerythritol stearic acid/adipic acid mixed ester (product of Riken Vitamin Kabushiki Kaisha, tradename "Rikestar EW-221"; esterified stearic acid/esterified adipic acid mole ratio=about 1/0.07; degree of esterification= 80–85%) and 100 g of glycerol monostearate were used combinedly in lieu of the combination of 200 g of dipentaerythritol hexastearate and 300 g of glycerol monostearate. The evaluation results are shown in Table 2.

EXAMPLE 7

Polymerization was carried out in the same manner as in Example 6 except that 200 g of glycerol monostearate was used in lieu of 100 g thereof. The evaluation results are shown in Table 2.

EXAMPLE 8

Polymerization was carried out in the same manner as in Example 6 except that 400 g of glycerol monostearate was used in lieu of 100 g thereof. The evaluation results are shown in Table 2.

COMPARATIVE EXAMPLE 4

Polymerization was carried out in the same manner as in Example 5 except that neither dipentaerythritol hexastearate nor glycerol monostearate was used. The evaluation results are shown in Table 2.

COMPARATIVE EXAMPLE 5

Polymerization was carried out in the same manner as in Example 5 except that the use of dipentaerythritol hexastearate was omitted. The evaluation results are shown in Table 2.

COMPARATIVE EXAMPLE 6

The vinyl chloride resin obtained in Comparative Example 4 was fully admixed with 200 g of the same pentaerythritol adipic acid/stearic acid mixed ester as used in Example 6 and 200 g of glycerol monostearate. The thus-obtained resin composition was evaluated in the same manner as in Example 5. The evaluation results are shown in Table 2.

TABLE 2

|  | Mean degree of polymerization | Flowability (poises) | Gelation property (minutes) |
| --- | --- | --- | --- |
| Example 5 | 690 | 128,000 | 2.0 |
| Example 6 | 680 | 139,000 | 1.9 |
| Example 7 | 680 | 132,000 | 1.6 |
| Example 8 | 680 | 103,000 | 0.6 |
| Comparative Example 4 | 690 | 270,000 | 2.2 |
| Comparative Example 5 | 680 | 238,000 | 1.2 |
| Comparative Example 6 | 690 | 225,000 | 2.0 |

What is claimed is:

1. A method of producing a vinyl chloride resin which comprises subjecting a monomer selected from the group consisting of vinyl chloride and a monomer mixture containing vinyl chloride, as a major component, and at least one ethylenically unsaturated monomer copolymerizable therewith as a minor component to polymerization reaction in the presence of a pentaerythritol or dipentaerythritol fatty acid ester and a glycerol fatty acid ester, wherein the pentaerythritol or dipentaerythritol fatty acid ester is used in an amount of about 0.01 to 10 parts by weight per 100 parts by weight of the monomer, the fatty acid constituting the pentaerythritol or dipentaerythritol fatty acid ester is a fatty acid containing 5 to 22 carbon atoms, the glycerol fatty acid ester is used in an amount of about 0.01 to 10 parts by weight per 100 parts by weight of the monomer, and the fatty acid constituting the glycerol fatty acid ester is a fatty acid containing 5 to 22 carbon atoms.

2. The method according to claim 1, wherein the fatty acid is at least one member selected from the group consisting of hexanoic acid, lauric acid, palmitic acid, stearic acid, oleic acid, arachic acid and behenic acid.

3. The men, hod according to claim 1, wherein the pentaerythritol or dipentaerythritol fatty acid ester contains, in addition to a fatty acid ester moiety, a dibasic organic acid ester moiety, in an amount of about 0.05 to 0.3 mole per mole of the fatty acid constituting the fatty acid ester moiety.

4. The method according to claim 3, wherein the dibasic acid is at least one member selected from the class consisting of malonic acid, maleic acid, succinic acid, glutaric acid, adipic acid, pimelic acid and phthalic acid.

5. The method according to claim 1, wherein the glycerol fatty acid ester is used in an amount of about 0.1 to 5 parts by weight per part by weight of the pentaerythritol or dipentaerythritol fatty acid ester.

* * * * *